No. 868,170. PATENTED OCT. 15, 1907.
J. G. EBKEN.
VEHICLE BRAKE.
APPLICATION FILED APR. 30, 1907.
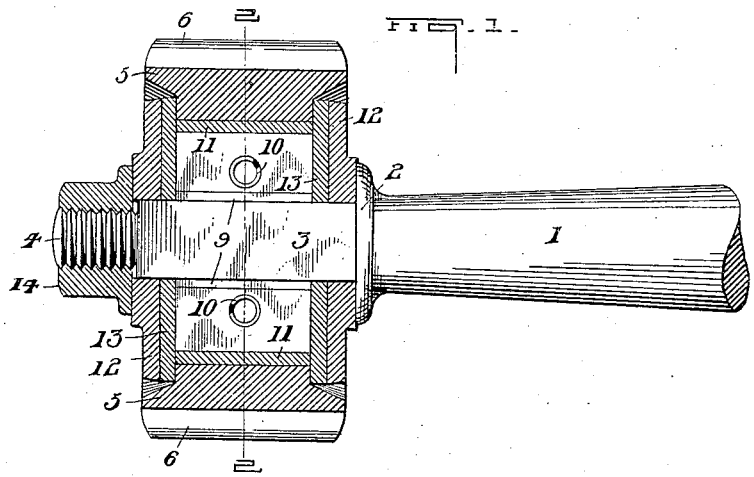
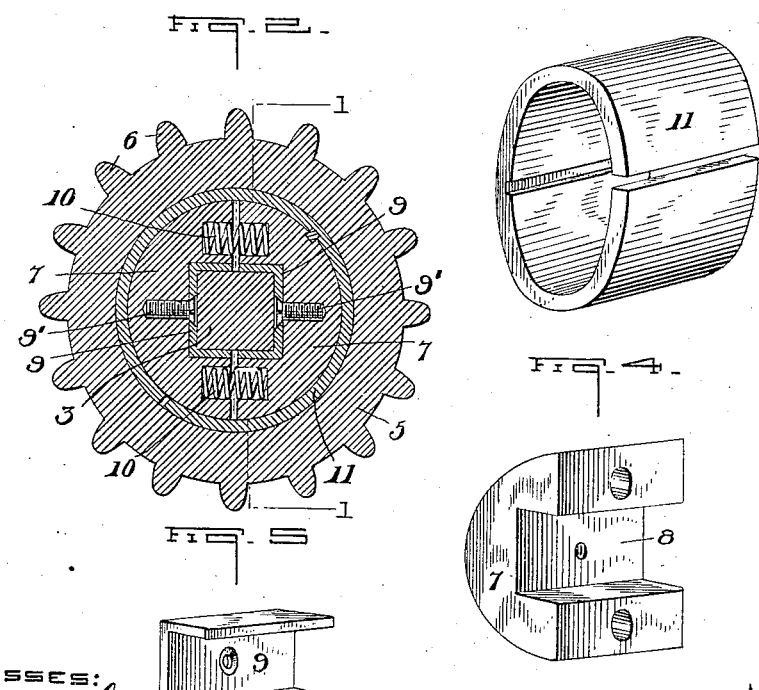
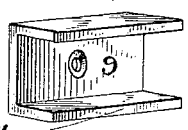
WITNESSES:
INVENTOR
John G. Ebken
By H. W. Stevens
ATTORNEY

UNITED STATES PATENT OFFICE.

JOHN G. EBKEN, OF PITTSBURG, PENNSYLVANIA.

VEHICLE-BRAKE.

No. 868,170.	Specification of Letters Patent.	Patented Oct. 15, 1907.

Application filed April 30, 1907. Serial No. 371,201.

*To all whom it may concern:*

Be it known that I, JOHN G. EBKEN, a citizen of the United States, residing at Pittsburg, in the county of Allegheny and State of Pennsylvania, have invented certain new and useful Improvements in Vehicle-Brakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention pertains to certain new and useful improvements in vehicle brakes of the rotary class which are adaptable on different varieties of vehicles having rubber tires, the primary object being to provide sufficient friction inside the brake wheel to retard the progress of the vehicle and minimize the wear and tear incidental to a direct frictional contact between the wheel and tire.

Reference is hereby made to my previous patent No. 761,460, dated May 31, 1904, which contains features somewhat similar to those involved in this application.

In the accompanying drawing, I have shown several different views of my invention, Figure 1, being a sectional view of my improved brake wheel as mounted on a shaft; taken on line 1—1 of Fig. 2. Fig. 2 is a cross section taken on line 2—2, Fig. 1, showing manner of producing friction inside the wheel. Fig. 3 is a detached perspective view of a wearing sleeve. Fig. 4 is a similar view of one half of the friction block, and Fig. 5, a similar view of a lining or wearing member.

Throughout the different views shown in the drawing the numeral 1 designates a brake-beam having a collar 2 and square portion 3 formed thereon; also a threaded end 4.

The brake proper is constructed in the form of a wheel 5, the periphery thereof being provided with a plurality of transversely disposed ribs 6—6 which are made sufficiently blunt or rounded to avoid tearing or injuring the rubber tire when brought in contact therewith. The inside of this brake-wheel 5 has a circular cored out portion designed and adapted to receive the two independent halves of a friction block 7, each of said half portions being provided with suitable registering recesses 8 designed to receive the square portion 3 of the beam 1. These said two halves of the friction block 7 while being prevented from rotating on said shaft, have lateral movement thereon. A contact metal lining 9 held in position by screws $9^1$, or any other suitable means, is provided in said recesses 8 when the said block 7 is composed of a material other than metal for the purpose of preventing any cutting or wearing of the portion 3 into the said block. Each half of said friction block is also provided with suitable registering recesses in which are seated the springs, or other tension members 10—10. Intermediate of the wheel 5 and friction block 7 may be placed a removable split wearing ring or sleeve 11 preferably held in position by being keyed, or otherwise fastened, to one half portion of the block 7, or it may be secured to the wheel 5, or else simply left free and independent of either member as may be found most expedient and preferable. This latter mentioned feature is not absolutely essential to the successful operation of my device, but will be found advantageous in preventing direct wear on the friction producing block 7, and can readily be replaced by a similar sleeve when necessary.

At each side of the brake-wheel 5 there is provided suitable washers 12 and 13 in order to exclude water and dirt from the interior parts, each having square central openings therein, in order to seat over the shaft portion 3 and be held stationary thereon.

An ordinary nut 14 serves to keep the wheel in position and all the specified parts in their proper registering contact therewith.

When my device is in position on the brake beam as shown on Fig. 1 of the drawing, and all the parts properly assembled as heretofore described, the contact of the brake wheel 5 with the tire of a revolving vehicle wheel, not shown, will cause said brake wheel 5 to also revolve, and the friction generated inside the said brake wheel, due to the outward and binding pressure of the tension means seated between the two independent halves of the block 7, which consequently are caused to bear against the inner cored out face of said wheel 5, or against the wearing sleeve 11, if the latter member is used, will be sufficient to retard the progress of said vehicle wheel; thus deriving the necessary benefits of a brake shoe without materially wearing or in any manner injuring the rubber tire. The tension springs 10, or any suitable substitute that may be found therefor, will, at all times, keep both half portions of the friction block 7 in close engagement with the wearing sleeve 11, or with the inner cored out face of the brake wheel 5 if said sleeve is dispensed with, and will likewise take up the wear incidental to the frictional contact of said two members. By having said wearing sleeve keyed to either half portion of the friction block 7, it will necessarily be held stationary and will receive the direct frictional contact of the revolving brake wheel 5 and in view of it being broken at one point will allow of the friction block 7 keeping said sleeve in close contact with the inside face of the wheel 5. It is also understood and apparent that there will be more or less space between the two halves of the friction block which will allow for any expansion or swelling of the material composing said block.

Having thus fully shown and described my invention what I claim as new and desire to secure by Letters Patent is:

1. A vehicle brake wheel designed to receive and revolve around a friction block held stationary on the brake beam, said friction block being in two independent halves and kept in close engagement with said wheel by a tension means seated between said two halves.

2. A vehicle brake wheel having a central cored out portion designed to receive and revolve around a friction block held stationary on the brake beam, said friction block being in two independent halves, each having lateral movement on said beam, and having tension means seated there between in order to keep said two halves in close engagement with said wheel.

3. A vehicle brake wheel having a central cored out portion designed to receive and revolve around a friction block held stationary on the brake-beam, said friction block being in two independent halves, each having lateral movement on said beam; a wearing sleeve seated between said wheel and the friction block; and tension means seated between the two halves of said friction block.

4. A vehicle brake wheel having a central cored out portion designed to receive and revolve around a friction block held stationary on the brake-beam, said friction block being in two independent halves each having lateral movement on said beam; a wearing sleeve seated between said wheel and the friction block; tension means seated between the two halves of said friction block, and suitable washers mounted over said beam and engaging the sides of the brake wheel.

In testimony whereof, I affix my signature, in presence of two witnesses.

JOHN G. EBKEN.

Witnesses:
   BEATRICE FITZGERALD,
   J. P. APPLEMAN.